United States Patent [19]
Kellar et al.

[11] 3,981,797
[45] Sept. 21, 1976

[54] CONTROL OF HYDROCARBON DEASPHALTING PROCESS

[75] Inventors: James S. Kellar, Des Plaines; Don B. Carson, Mount Prospect; David M. Boyd, Claredon Hills, all of Ill.

[73] Assignee: UOP Inc., Des Plaines, Ill.

[22] Filed: July 21, 1975

[21] Appl. No.: 597,625

[52] U.S. Cl............................. 208/309; 196/14.52; 208/DIG. 1
[51] Int. Cl.$^2$........................................ C10G 21/00
[58] Field of Search........................ 208/309, DIG. 1

[56] References Cited
UNITED STATES PATENTS
3,423,308   1/1969   Murphy ............................. 208/309

Primary Examiner—Herbert Levine
Attorney, Agent, or Firm—James R. Hoatson, Jr.; Robert W. Erickson; William H. Page, II

[57] ABSTRACT

Maximum removal of asphaltic material, including high molecular weight metallic contaminants, from a hydrocarbonaceous charge stock is achieved through the utilization of a solvent extraction zone provided with direct top-heating facilities in the upper portion thereof. The top-heating section of the extraction zone is divided into two liquid-collecting zones in partial open communication with each other. A portion of the liquid is removed from the lower liquid-collecting zone, increased in temperature and returned to the extractor in the upper liquid-collecting zone. The flow rate of liquid withdrawn from the lower zone is controlled in response to the differential pressure between the two liquid-collecting zones.

13 Claims, 1 Drawing Figure

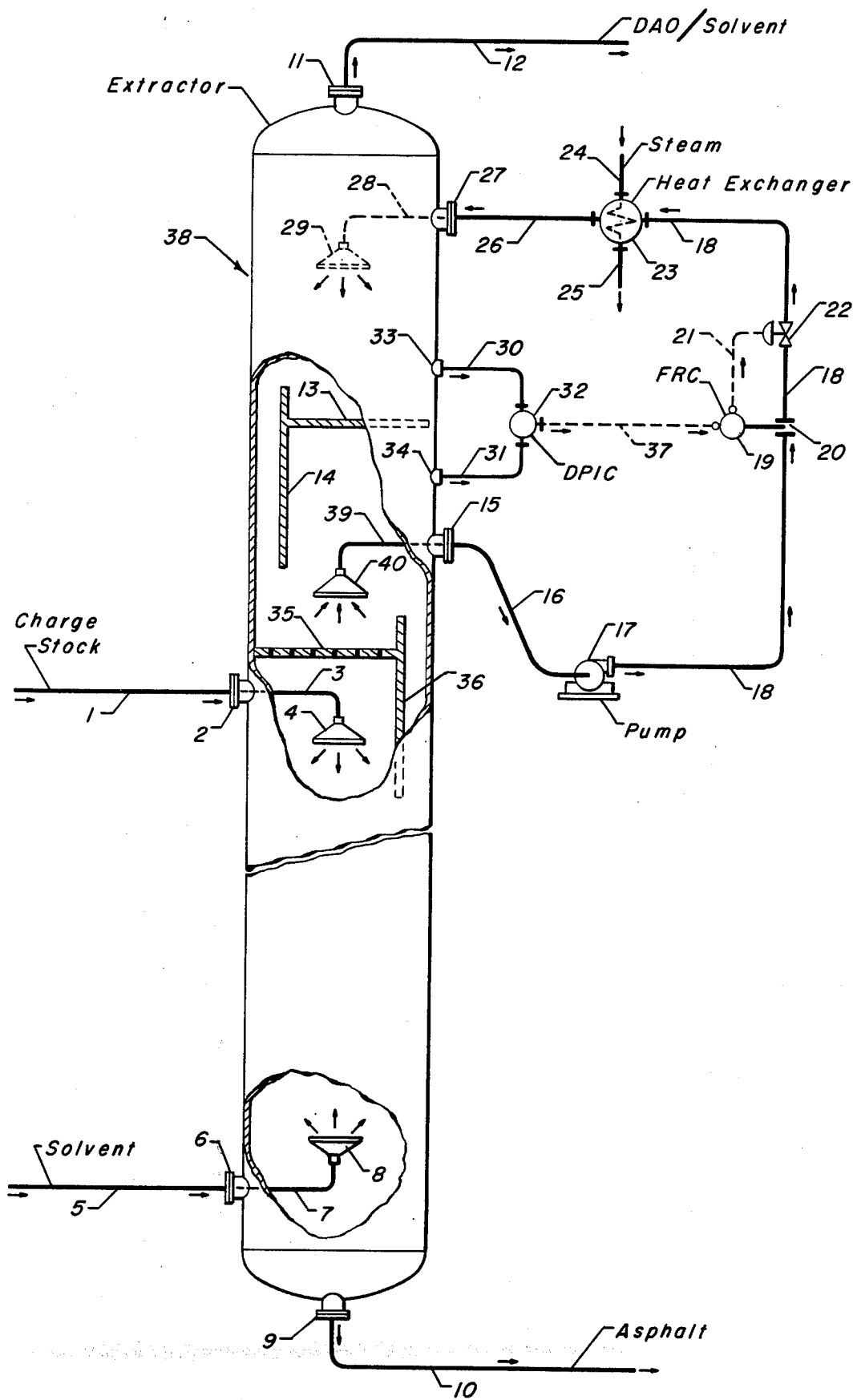

CONTROL OF HYDROCARBON DEASPHALTING PROCESS

APPLICABILITY OF INVENTION

Our invention, as herein described, is intended for utilization in the removal of hydrocarbon-insoluble asphaltenic material from hydrocarbonaceous charge stocks containing the same. More specifically, the present invention is directed toward a process for deasphalting atmospheric tower bottoms, vacuum tower bottoms (vacuum residuum), crude oil residuum, topped crude oils, coal oil extract, shale oils, oils recovered from tar sands, etc., all of which are notoriously egregious, have come to be referred to in the art as "black oils," and which contain varying quantities of asphaltic material.

Petroleum crude oils, particularly those heavy oils extracted from tar sands, topped or reduced crudes and vacuum residuum, contain high molecular weight sulfurous compounds in exceedingly large quantities. In addition, such black oils contain excessive quantities of nitrogenous compounds, high molecular weight organometallic complexes, principally containing nickel and vanadium, and varying quantities of asphaltenic material with which the metallic contaminants are generally associated. An abundant supply of such charge stocks exist, most of which have a gravity less than about 20.0 °API. Black oils are generally characterized, in the art, as having a boiling range indicating that at least 10.0 percent by volume, or more, boils above a temperature of about 1050°F.

Knowledgeable experts are presently predicting a world-wide energy crisis in the not-too-distant future. Those possessing expertise in the field of petroleum exploration are concerned with the ever-dwindling reserve supply of natural gas as compared to the ever-increasing demand therefor. As a result of legislation being imposed upon the sulfur content of liquid fuel oils, burned to meet certain energy requirements, more and more energy suppliers are looking to natural gas as a substitute. Several processes are being proposed which, it is believed, will alleviate the predicted forthcoming critical shortage of natural gas. These generally involve the conversion of naphtha fractions, via steam reforming and shift methanation, into a "substitute" natural gas which is rich in methane. However, this in turn creates a shortage of naphtha boiling range material for utilization as motor fuel. Likewise, a shortage of kerosine boiling range fractions, principally employed as jet fuels and gas oils, will stem from the necessity to convert such charge stocks to suitable automotive fuel. A multitude of factors are, therefore, contributing to the developing energy crisis. Processing technology is required to insure the utilization of virtually 100 percent of the available petroleum crude oil charge stocks. In the petroleum refining art, this is commonly referred to as converting the "bottom of the barrel."

The deasphalting process encompassed by the present invention supplies at least some of the technology required to permit utilization of hydrocarbonaceous black oils for ultimate conversion into distillable hydrocarbons. Specific examples of those charge stocks to which the present process is applicable, include a vacuum tower bottoms having a gravity of 7.1 °API, and containing 4.5 percent by weight of sulfur and 23.7 percent by weight of asphaltics; a "topped" crude oil having a gravity of 11.0 °API, and containing 10.0 percent by weight of asphaltics and 5.20 percent by weight of sulfur; and a vacuum residuum having a gravity of about 8.8 °API, containing about 3.0 percent by weight of sulfur, and having a 20.0 percent volumetric distillation temperature of about 1055°F.

When attempting the maximum recovery of distillable hydrocarbons via the catalytic conversion of such heavy hydrocarbonaceous material, the principal difficulty encountered involves declining catalyst activity and stability resulting from the lack of suitable processing techniques to permit the severe conditions required to convert non-distillables into lower-boiling products. Catalyst instability, when processing black oil charge stocks in a fixed-bed reaction system, also stems from the presence of the asphaltenic material. This consists primarily of high-molecular weight, non-distillable coke precursors, insoluble in light hydrocarbons such as pentane or heptane, and with which are associated sulfur and metallic contaminants. The asphaltic material is dispersed within the black oil, and, when subjected to the operating conditions required, has the tendency to agglomerate and polymerize, as a result of which the active surfaces of the catalytic composite are effectively shielded from the material being processed. The metallic contaminants associated with the high-boiling asphaltenic fraction, also adversely affect catalyst stability and activity. Therefore, it behooves the industry to provide continued improved technology with respect to the removal of these high-molecular weight coke precursors while simultaneously recovering distillable hydrocarbons to the greatest possible extent.

OBJECTS AND EMBODIMENTS

A principal object of the present invention is to provide a more efficient and controlled solvent deasphalting process. A corollary objective involves the recovery of deasphalted oil (DAO) containing a lesser quantity of asphaltic material than heretofore obtained.

Another object of our invention is directed toward a solvent deasphalting system requiring less maintenance, less initial capital investment and which will afford an extension of the effective on-stream time.

Therefore, in one embodiment, our invention provides a process for deasphalting an asphalt-containing hydrocarbonaceous charge stock, in a solvent extraction zone, which comprises the steps of: (a) countercurrently contacting said charge stock, introduced into said extraction zone through a first locus thereof, with a hydrocarbon-selective solvent, introduced into said zone through a lower second locus thereof, at extraction conditions selected to produce a solvent-lean asphaltic stream and a solvent-rich hydrocarbon stream; (b) withdrawing said asphaltic stream from said extraction zone through a third locus thereof, said third locus being below said second locus, and a solvent-rich deasphalted oil stream from an upper fourth locus thereof; (c) withdrawing at least a portion of said solvent-rich hydrocarbon stream through a fifth locus intermediate said first and fourth loci, said fifth locus being in open communication with a lower liquid-collecting zone within a divided top-heating section of said extraction zone; (d) increasing the temperature of said portion of the solvent-rich hydrocarbon stream and introducing the heated portion into said extraction zone through a sixth locus intermediate said fourth and fifth loci, said sixth locus being in open communication with an upper liquid-collecting zone within said divided top-heating section; (e) determining the pressure differential between said lower and upper liquid-collecting zones; and, (f) adjusting the rate at which said solvent-rich hydrocarbon stream is withdrawn through said fifth locus in response to said differential pressure.

In another specific embodiment, our invention encompasses a method for controlling the heat-input to the top-heating section of a solvent extraction zone in which an asphalt-containing charge stock is countercurrently contacted with a hydrocarbon-selective solvent, at extraction conditions selected to produce a solvent-lean asphaltic stream and a solvent-rich hydrocarbon stream, which method comprises the steps of: (a) withdrawing at least a portion of said solvent-rich hydrocarbon stream from a first locus in open communication with a lower liquid-collecting zone within said top-heating section; (b) increasing the temperature of the portion of said solvent-rich hydrocarbon stream and introducing the heated portion through a second locus in open communication with an upper liquid-collecting zone within said top-heating section; (c) determining the pressure differential between said lower and upper liquid-collecting zones; (d) developing a signal representative of said pressure differential; and, (e) adjusting the rate at which said solvent-rich hydrocarbon stream is withdrawn through said first locus in response to said signal.

Other objects and embodiments of our invention reside in particular operating conditions and techniques, as well as preferred solvents for utilization in the extraction zone. For example, in one such other embodiment, the temperature of that portion of the solvent-rich hydrocarbon phase withdrawn through said fifth locus is increased from about 25°F. to about 125°F. above its original temperature.

PRIOR ART

It must be recognized and acknowledged that the prior art abounds with a wide spectrum of techniques utilized in the solvent deasphalting of asphaltic, hydrocarbonaceous charge stocks. In the interest of brevity, no attempt is herein made to delineate exhaustively such solvent deasphalting art. However, several illustrations of prior art deasphalting processes will be described briefly in order to show the particular area in which our invention is intended to be applied.

The broad concept of solvent deasphalting is discussed in U.S. Pat. No. 2,081,473 (Cl. 208–14). Suggested suitable solvents include light petroleum fractions, such as naphtha, casinghead gasoline and distillates which are normally vaporous at standard conditions of temperature and pressure. Preferred solvents are indicated as being liquefied normally gaseous hydrocarbons including methane, ethane, propane, butane, or mixtures thereof.

An improved deasphalting technique is described in U.S. Pat. No. 2,587,643 (Cl. 208–309) wherein the hydrocarbon solvents are utilized in admixture with a modifier comprising an organic carbonate. A similar technique is described in U.S. Pat. No. 2,882,219 (Cl. 208–86), wherein an aromatic hydrocarbon is added to the charge stock prior to subjecting the same to solvent extraction.

More recently, the integration of deasphalting with multiple-stage catalytic conversion is found in U.S. Pat. No. 3,775,292 (Cl. 208–86). U.S. Pat. No. 3,830,732 (Cl. 208–309) describes a two-stage solvent deasphalting technique which initially provides a resin- and asphaltene-containing, solvent-lean hydrocarbon phase which is subjected to a second solvent deasphalting technique in order to recover a resin concentrate and to reject an asphaltic pitch.

SUMMARY OF INVENTION

When the chronological history of the art of solvent deasphalting is traced, it becomes apparent that those having the requisite expertise recognized the benefits afforded through the addition of heat to the upper section of the extraction zone (above the feed tray, or deck). This technique has the effect of increasing the quantity of precipitated asphaltic material withdrawn as the bottoms product. This so-called "top-heating" was, and continues to be, accomplished through the use, for example, of internally disposed pipes and headers (tube banks), using external high-pressure steam as the heat-exchange medium. While this indirect heating technique does increase the amount of precipitated asphalt, it is at best only partially successful -- e.g. a sufficient quantity of the asphaltic material remains in the deasphalted oil (DAO) to adversely affect the catalyst employed in any subsequent catalytic conversion system. Through the use of our invention, the carryover of asphaltenic matter with the DAO is further diminished, and the recovery of the latter is improved. In accordance with our inventive concept, the top-heating is accomplished directly by withdrawing a portion of the solvent-rich hydrocarbon phase from the extraction zone, through a locus above the column feed tray, and preferably above the uppermost tray, or deck therein. This stream is increased in pressure and heated to a temperature from 25°F. to 125°F. above that at which it was removed. The heated stream is then introduced into the extraction zone through a locus intermediate the locus through which the DAO/solvent overhead stream is withdrawn, and that locus through which the stream had been removed at the lower temperature. This technique is more efficient and permits more positive distribution of heat which results in a significantly better operation. In a preferred embodiment, the heated solvent-rich hydrocarbon stream is reintroduced through suitable distributing means, in a downwardly-flowing direction, which promotes and provides phase separation of the precipitated asphalts.

In the present specification and the appended claims, the "top-heating" section of the extraction zone is defined as the area above the first tray, or deck (or above the locus through which the charge stock is introduced) and below the outlet port through which the DAO/solvent stream is withdrawn. The top-heating section is divided to provide upper and lower liquid-collecting zones; the solvent-rich hydrocarbon stream is withdrawn from the lower zone, increased in temperature and reintroduced into the upper zone. When dividing the top-heating section to form the upper and lower liquid-collecting zones, provision must be made to afford open communication therebetween to allow precipitated asphaltic material to flow into the lower zone. This is perhaps best accomplished by providing a "blind" tray equipped with a downcomer. In a preferred technique, the downcomer will discharge onto a perforated tray below which the charge stock is introduced. Pressure taps are provided above and below the blind tray in order to determine the pressure differential between the upper and lower liquid-collecting zones. A representative differential pressure signal is developed by a Differential Pressure Indicator Controller (DPIC) and transmitted thereby to flow-regulating means in order to adjust the rate at which the solvent-rich hydrocarbon stream is withdrawn from the lower liquid-collecting zone. Suitable flow-regulating means may consist of a Flow Recorder Controller (FRC) which transmits a signal to the pump employed in removing the stream from the extraction zone. In the illustration hereinafter presented, the flow-regulating means comprises an FRC, an orifice plate, or other flow-metering device, and a control valve. The signal from the DPIC is transmitted to the FRC to reset the set-point thereof; the control valve is adjusted accordingly. Ideally, the pressure differential is controlled at an essentially zero level; if the pressure in the upper liquid collecting zone should become greater than that in the lower liquid-collecting zone, too much liquid is being removed from the latter, and the control valve will be caused to close. Conversely, when too little liquid is being removed, the pressure in the lower collecting zone will be greater, and the control valve will be caused to open.

In accordance with the present process, the asphaltic charge stock is countercurrently contacted with a hydrocarbon-selective solvent, in a solvent extraction zone, at extraction conditions selected to produce a solvent-lean asphaltic stream and a solvent-rich hydrocarbon stream. In the present specification as well as the appended claims, the term "solvent-rich hydrocarbon stream" is intended to allude to a stream in the upper section of the extraction zone as distinguished from the deasphalted oil/solvent stream removed as an overhead product. The solvent extraction zone will function at temperature in the range of about 50°F. to about 600°F., and preferably from about 100°F. to about 400°F.; the pressure will be maintained within the range of about 100 to about 1,000 psig., and preferably from about 200 to about 600 psig. The solvent/charge stock volumetric ratio will be in the range of about 2.0:1.0 to about 30.0:1.0, and preferably from about 3.0:1.0 to about 10.0:1.0. Judicious procedures involve the selection of temperature and pressure to maintain the extraction operations in liquid phase.

Suitable solvents include those hereinbefore described with respect to prior art deasphalting techniques. Thus, it is contemplated that the solvent will be selected from the group of light hydrocarbons including ethane, propane, butane, isobutane, pentane, isopentane, neopentane, hexane, isohexane, heptane, the mono-olefinic counterparts thereof, etc. Furthermore, the solvent may be a normally liquid naphtha fraction containing hydrocarbons having from about 5 to about 14 carbon atoms per molecule, and preferably a naphtha distillate having an end boiling point below about 200°F. With respect to the group of light hydrocarbons containing from about 3 to about 7 carbon atoms per molecule, preferred techniques dictate the utilization of a mixture thereof. Suitable solvent mixtures will comprise, for example, normal butane and isopentane, propane and normal butane, normal butane and normal pentane, etc.

The asphaltic, hydrocarbonaceous charge stock is introduced into the extraction zone in a downwardly direction, through an upper first locus, and therein contacts an upwardly flowing solvent stream, introduced through a lower second locus. A solvent-lean asphaltic stream is withdrawn from the extraction zone at a lower third locus, below the second locus; the solvent-rich deasphalted oil stream is removed from an upper, fourth locus. The rejected asphaltic material will contain virtually all of the metallic contaminants originally present in the fresh feed charge stock. The sulfur content will be approximately twice that of the charge stock. A portion of the solvent-rich hydrocarbon stream is withdrawn from within the extraction zone through a fifth locus which is intermediate the first and fourth loci, and is increased to a temperature level at least about 25°F. to about 125°F. above that at which it was removed. For example, this stream may be withdrawn at a temperature of about 220°F. and reintroduced into the extraction zone at a temperature of about 270°F. The thus-heated stream is introduced through a sixth locus in a downwardly direction using suitable distributing means to provide and promote phase separation of the asphaltenic material. Additional asphaltic material, including high-boiling sulfurous compounds and the asphalt-associated metallic contaminants, is precipitated and the quality and recovery of DAO increased.

As contrasted to the prior art technique of indirect top-heating through, for example, the use of tube banks, the above-described direct heating scheme involves less maintenance, is more efficient and provides stability of operation as a result of more positive heat distribution. Furthermore, less tower space is consumed for top-heating purposes and a significantly longer on-stream time is afforded.

Other conditions and preferred operating techniques will be given in conjunction with the following description of the present process. Reference will be made to the accompanying drawing in which details such as compressors, pumps, heaters and coolers, instrumentation and controls, heat-exchange and heat-recovery circuits, valving, start-up lines and similar hardware have been eliminated, or reduced in number as being non-essential to an understanding of the present invention. The use of such miscellaneous appurtenances is directed principally to the recovery of solvent for recycle to the extration zone, and such is well within the purview of those skilled in the art. The use thereof, to modify the present process, is within the scope and spirit of the appended claims.

DESCRIPTION OF DRAWING

For the purpose of demonstrating the illustrated embodiment, the drawing will be described in connection with the solvent extraction of a vacuum column bottoms feed stock in a commercially designed unit. It is understood that the charge stock, stream compositions, operating conditions and the like are exemplary only, and may be varied widely without departure from the spirit of our invention. The charge stock exhibits a gravity of 8.8 °API, an average molecular weight of about 620 and is processed in an amount of about 10,050 Bbl./day. The hydrocarbon-selective solvent is a 50/50 volumetric mixture of normal butane and isopentane, and the solvent to charge stock volumetric ratio is about 5.0:1.0.

With reference now to the drawing, there is illustrated, in a partially sectioned view, a solvent extraction column 38. In the interest of simplicity, only the decks, or trays above feed inlet port 2 have been shown. The precise design of the decks will be generally selected on the basis of charge stock characteristics, the particular solvent selected and the intended recovery of DAO, and, therefore, is not a limiting, or essential feature of our invention. The charge stock, in an amount of about 238.52 moles/hr., admixed with about 274.42 moles/hr. of the normal butane/isopentane solvent, enters extraction zone 38 through line 1 and inlet port 2 (first locus). The combined feed enters the column via line 3 at a temperature of about 230°F. and a pressure of about 370 psig., and is directed downwardly by way of distribution means 4. As a general practice, the combined feed will be introduced above one of the top five trays, or decks in the extraction zone. For the purposes of this illustration, the feed is shown as entering between uppermost perforated tray 35, having downcomer 36, and the second tray (not illustrated) in the column. As employed herein, and as recognized by those skilled in the art, the term "top-heating section" alludes to that portion of the extraction zone above the top tray, in this case, above tray 35. Usually, this top-heating section is devoid of trays, decks, or other devices, excluding, of course, the internally-disposed tube banks. In accordance with our invention, however, the top-heating section is divided by blind tray 13, having downcomer 14, to provide an upper liquid-collecting zone (above blind deck 13) and a lower liquid collecting zone (between blind tray 13 and tray 35).

The solvent mixture of normal butane and isopentane, in an amount of about 6,585.97 moles/hr., is introduced into the extraction zone via line 5 and inlet port 6 (second locus), and is directed in an upwardly direction through line 7 and distribution means 8 at a temperature of about 220°F. and a pressure of about 370 psig. The solvent mixture is generally introduced into the extraction zone below the lowermost perforated tray therein. An asphaltic phase is withdrawn from the bottom of the extraction zone through outlet port 9 (third locus) and line 10 at a temperature of about 225°F. and a pressure of about 370 psig., and consists of about 37.33 moles/hr. of asphaltenic material, about 89.64 means/hr. of normal butane and about 77.21 moles/hr. of isopentane. This stream will be transported to a suitable solvent recovery system from which the recovered solvent is recycled to the extraction zone. Deasphalted oil, in the amount of about 201.20 moles/hr., is removed through outlet port 11 (fourth locus) and line 12, at a temperature of about 270°F. and a pressure of about 350 psig., along with about 3595.99 moles/hr. of normal butane and about 3,097.54 moles/hr. of isopentane. This material is also transported to a solvent recovery facility from which the solvent is recycled to the extraction zone.

About 6,904.5 moles/hr. of the solvent-rich hydrocarbon phase is internally withdrawn from the lower liquid-collecting zone of the top-heating section through suction means 40 and line 39, removed from the extraction zone through outlet port 15 (fifth locus) and introduced via line 16 into pump 17. The latter discharges by way of line 18, containing fluid-metering means 20 and control valve 22, and is introduced thereby into heat-exchanger 23 at a temperature of about 220°F. Metering means 20 transmits a flow rate signal to Flow Recorder Controller 19 which compares the signal to the rate at which its set-point is fixed. In response thereto, FRC 19 develops and transmits an appropriate output signal, through instrument line 21 to adjust control valve 22 in response thereto. In this particular illustration, high-pressure steam from line 24 serves as the heating medium, and exits heat-exchanger 23 via line 25. It is understood that the use of high-pressure steam in this instance is exemplary only and is not intended to be a limiting feature of our invention. The heated material, at a temperature of about 270°F., passes through line 26 and inlet port 27 (sixth locus) to be discharged downwardly, through line 28 and distributing means 29, into the upper liquid-collecting zone of the top-heating section.

As hereinbefore stated, the upper and lower liquid-collecting zones of the divided top-heating section are formed through the installation of blind tray 13, and are in partial open communication with each other through downcomer 14 attached thereto. The pressure differential between the liquid-collecting zones is obtained via pressure taps 33 and 34, located immediately above and below blind tray 13, and lines 30 and 31, respectively. The differential pressure is sensed by Differential Pressure Indicator Controller (DPIC), which is set to maintain an essentially zero pressure differential between the two liquid-collecting zones, and which develops an output signal representative of the variance between the indicated pressure differential and zero. This output signal is transmitted through instrument line 37 to FRC 19 to reset automatically the setpoint thereof. FRC 19 then transmits the signal, via instrument line 21, to control valve 22 to adjust the opening thereof in response thereto. By way of illustration, it will be presumed that the flow rate of the solvent-rich hydrocarbon stream through line 16 is excessive and thus results in a lesser quantity of liquid in the lower liquid-collecting zone below blind tray 13. This will, in turn, produce a pressure differential which is divergent from zero across the blind tray, and which is sensed by DPIC 32 via pressure taps 30 and 31. DPIC 22 develops and transmits a responsive output signal to FRC 19, whereby the setpoint thereof is reset. FRC 19 adjusts control valve 22 which restricts the flow of the solvent-rich hydrocarbon stream in line 18.

The foregoing clearly indicates the method by which our invention is effected and the benefits afforded through the utilization thereof. Deasphalted oil, containing less than about 0.05 percent by weight of asphaltenic material, is recovered in an amount of about 84.7 volume percent.

We claim as our invention:

1. A process for deasphalting an asphalt-containing hydrocarbonaceous charge stock, in a solvent extraction zone, which comprises the steps of:
   a. countercurrently contacting said charge stock, introduced into said extraction zone through a first locus thereof, with a hydrocarbon-selective solvent, introduced into said zone through a lower second locus thereof, at extraction conditions selected to produce a solvent-lean asphaltic stream and a solvent-rich hydrocarbon stream;
   b. withdrawing said asphaltic stream from said extraction zone through a third locus thereof, said third locus being below said second locus, and a solvent-rich deasphalted oil stream from an upper fourth locus thereof;
   c. withdrawing at least a portion of said solvent-rich hydrocarbon stream through a fifth locus intermediate said first and fourth loci, sid fifth locus being in open communication with a lower liquid-collecting zone within a divided top-heating section of said extraction zone;
   d. increasing the temperature of said portion of the solvent-rich hydrocarbon stream and introducing the heated portion into said extraction zone through a sixth locus intermediate said fourth and fifth loci, said sixth locus being in open communication with an upper liquid-collecting zone within said divided top-heating section;

e. determining the pressure differential between said lower and upper liquid-collecting zones; and, f. adjusting the rate at which said solvent-rich hydrocarbon stream is withdrawn through said fifth locus in response to said differential pressure.

2. The process of claim 1 further characterized in that said first and second liquid-collecting zones are in partial open communication with each other.

3. The process of claim 1 further characterized in that said extraction conditions include temperatures in the range of about 50°F. to about 600°F., pressures from about 100 to about 1,000 psig. and a solvent/charge stock volumetric ratio in the range of about 2.0:1.0 to about 30.0:1.0.

4. The process of claim 1 further characterized in that the temperature of the solvent-rich hydrocarbon stream, withdrawn through said fifth locus, is increased about 25°F. to about 125°F.

5. The process of claim 1 further characterized in that the heated solvent-rich hydrocarbon stream is introduced through said sixth locus in a downwardly direction.

6. The process of claim 1 further characterized in that said solvent comprises a light hydrocarbon having from 3 to about 7 carbon atoms per molecule.

7. The process of claim 1 further characterized in that said solvent is a normally liquid naphtha fraction having an end boiling point below about 200°F.

8. The process of claim 6 further characterized in that said solvent comprises a mixture of normal butane and isopentane.

9. The process of claim 6 further characterized in that said solvent comprises a mixture of propane and normal butane.

10. The process of claim 6 further characterized in that said solvent is isopentane.

11. A method for controlling the heat-input to the top-heating section of a solvent extraction zone in which an asphalt-containing charge stock is countercurrently contacted with a hydrocarbon-selective solvent, at extraction conditions selected to produce a solvent-lean asphaltic stream and a solvent-rich hydrocarbon stream, which method comprises the steps of:

a. withdrawing at least a portion of said solvent-rich hydrocarbon stream from a first locus in open communication with a lower liquid-collecting zone within said top-heating section;

b. increasing the temperature of the portion of said solvent-rich hydrocarbon stream and introducing the heated portion through a second locus in open communication with an upper liquid-collecting zone within said top-heating section;

c. determining the pressure differential between said lower and upper liquid-collecting zones;

d. developing a signal representative of said pressure differential; and, e. adjusting the rate at which said solvent-rich hydrocarbon stream is withdrawn through said first locus in response to said signal.

12. The method of claim 11 further characterized in that said first and second liquid-collecting zones are in partial open communication with each other.

13. The method of claim 11 further characterized in that the temperature of the solvent-rich hydrocarbon stream withdrawn through said first locus is increased from 25°F. to about 125°F.

* * * * *